US011038650B2

(12) United States Patent
Yerramalli et al.

(10) Patent No.: US 11,038,650 B2
(45) Date of Patent: Jun. 15, 2021

(54) CONFIGURATION OF DOWNLINK AND UPLINK PARTIAL SUBFRAMES IN SHARED RADIO FREQUENCY SPECTRUM

(71) Applicant: QUALCOMM Incorporated, San Diego, CA (US)

(72) Inventors: Srinivas Yerramalli, San Diego, CA (US); Jing Sun, San Diego, CA (US); Wanshi Chen, San Diego, CA (US); Alberto Rico Alvarino, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 15/969,536

(22) Filed: May 2, 2018

(65) Prior Publication Data

US 2018/0323935 A1 Nov. 8, 2018

Related U.S. Application Data

(60) Provisional application No. 62/502,455, filed on May 5, 2017.

(51) Int. Cl.
*H04L 5/00* (2006.01)
*H04W 72/04* (2009.01)
(Continued)

(52) U.S. Cl.
CPC ......... *H04L 5/0053* (2013.01); *H04W 72/042* (2013.01); *H04W 74/0808* (2013.01); (Continued)

(58) Field of Classification Search
CPC ......... H04L 1/005; H04L 1/001; H04L 1/009; H04W 72/042; H04W 72/0446; H04W 74/0808
See application file for complete search history.

(56) References Cited

U.S. PATENT DOCUMENTS

2014/0112168 A1  4/2014 Chen et al.
2016/0134397 A1  5/2016 Kobayashi
(Continued)

FOREIGN PATENT DOCUMENTS

EP       3041304 A1   7/2016
WO    WO-2009143382 A2  11/2009

OTHER PUBLICATIONS

International Search Report and Written Opinion—PCT/US2018/030902—ISA/EPO—dated Sep. 25, 2018.
(Continued)

*Primary Examiner* — Kent Krueger
(74) *Attorney, Agent, or Firm* — Norton Rose Fulbright

(57) ABSTRACT

Configuration of downlink and uplink partial subframes in shared radio frequency (RF) spectrum is discussed. The various described aspects provide for different configurations for start and end transmissions from base stations and user equipments (UEs) when transmitting over partial subframes. With downlink initial partial subframes, a uniform puncturing may be used to reduce the number of resource elements (REs) available for downlink transmission without causing the base station to re-precode any of the data. Additional aspect for downlink partial subframe transmission allows for downlink control channels to identify multiple start points within the subframe at short downlink shared channel locations. On the uplink aspect, UEs may be informed with configurations for both full and partial subframe transmissions. The UE will select which configuration to use based on whether it will transmit on full or partial subframes. Additionally, a UE have scheduled or semi-scheduled modes for partial subframe transmissions.

30 Claims, 13 Drawing Sheets

(51) Int. Cl.
*H04W 74/08* (2009.01)
*H04W 16/14* (2009.01)
*H04L 25/02* (2006.01)

(52) U.S. Cl.
CPC .............. *H04L 5/001* (2013.01); *H04L 5/005* (2013.01); *H04L 5/0051* (2013.01); *H04L 5/0055* (2013.01); *H04L 5/0094* (2013.01); *H04L 25/02* (2013.01); *H04W 16/14* (2013.01); *H04W 72/0446* (2013.01)

(56) References Cited

U.S. PATENT DOCUMENTS

| | | | | |
|---|---|---|---|---|
| 2017/0048884 | A1* | 2/2017 | Jung | H04L 5/001 |
| 2018/0332478 | A1* | 11/2018 | Noh | H04W 16/14 |
| 2019/0069312 | A1* | 2/2019 | Oh | H04W 52/34 |
| 2019/0132104 | A1* | 5/2019 | Lee | H04L 5/0094 |

OTHER PUBLICATIONS

Nokia, et al., "Multiple Starting and Ending Positions in a Subframe for UL," 3GPP Draft; R1-1704804_LTE UNLICENSED_UL, 3rd Generation Partnership Project (3GPP), Mobile Competence Centre; 650, Route Des Lucioles; F-06921 Sophia-Antipolis Cedex; France, vol. RAN WG1, no. Spokane, US; Apr. 3, 2017-Apr. 7, 2017, Mar. 24, 2017, XP051250873, 3 pages, Retrieved from the Internet: URL: http://www.3gpp.org/ftp/tsg_ran/WG1_RL1/TSGR1_88b/Docs/ [retrieved on Mar. 24, 2017].

* cited by examiner

CONFIGURATION OF DOWNLINK AND UPLINK PARTIAL SUBFRAMES IN SHARED RADIO FREQUENCY SPECTRUM

CROSS-REFERENCE TO RELATED APPLICATIONS

This application claims the benefit of U.S. Provisional Patent Application No. 62/502,455, entitled, "CONFIGURATION OF DOWNLINK AND UPLINK PARTIAL SUBFRAMES IN SHARED RADIO FREQUENCY SPECTRUM," filed on May 5, 2017, which is expressly incorporated by reference herein in its entirety.

BACKGROUND

Field

Aspects of the present disclosure relate generally to wireless communication systems, and more particularly, to configuration of downlink and uplink partial subframes in shared radio frequency (RF) spectrum.

Background

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes detecting, by the base station, a successful listen before talk (LBT) procedure over a shared spectrum, wherein the successful LBT procedure is detected at a first transmission start point after a subframe boundary, precoding, by the base station, a first block of data for transmission to a UE over available transmission resource elements in an initial partial subframe from the first transmission start point to a next subframe boundary, puncturing, by the base station, a set of resource elements of the available transmission resource elements with the precoded first block of data, wherein the puncturing is uniform over time and frequency of the initial partial subframe, and transmitting, by the base station, the precoded first block of data over the available transmission resource elements to the UE.

In an additional aspect of the disclosure, a method of wireless communication includes monitoring, by a UE, for a downlink grant from a serving base station in a first symbol of a first slot of a subframe, receiving, by the UE, downlink data from the serving base station over a set of downlink transmission resources of the subframe identified by the downlink grant in response to detection of the downlink grant in the first symbol of the first slot, monitoring, by the UE, for a plurality of downlink grants from the serving base station in a first symbol of a second slot of the subframe in response to failure to detect the downlink grant in the first symbol of the first slot, and receiving, by the UE, the downlink data from the serving base station over a plurality of sets of downlink transmission resources associated with each of the plurality of downlink grants detected in the first symbol of the second slot.

In an additional aspect of the disclosure, a method of wireless communication includes receiving, by a UE from a serving base station, a first uplink configuration associated with uplink transmission for a full subframe and a second uplink configuration associated with uplink transmission for a partial subframe, determining, by the UE, transmission status of an ending transmission of an ending uplink subframe, transmitting the ending transmission according to the first uplink configuration when the transmission status indicates a full subframe transmission, and transmitting the ending transmission according to the second uplink configuration when the transmission status indicates a partial subframe status.

In an additional aspect of the disclosure, a method of wireless communication includes receiving, at a UE from a serving base station, downlink control information identifying an uplink transmission start in a second slot of a subframe, receiving, at the UE from the serving base station, an uplink configuration for transmission over a partial subframe, and transmitting, by the UE, uplink data over the partial subframe in the second slot according to the uplink configuration.

In an additional aspect of the disclosure, a method of wireless communication includes receiving, at a UE from a serving base station, an uplink grant identifying an uplink transmission over a full length of a subframe, detecting, by the UE, failure of a LBT procedure for transmission over the full length of the subframe, detecting by the UE, success of a next LBT procedure at a subsequent symbol of the subframe, and transmitting, by the UE, uplink data in a starting symbol of the subframe after the success of the next LBT procedure.

In an additional aspect of the disclosure, a method of wireless communication includes sending, by a base station, an uplink grant to a user equipment, wherein the uplink grant identifies uplink transmission for a full length of a subframe, monitoring, by the base station, for a demodulation reference signal transmitted by the UE, determining, by the base station, that the UE performs the uplink transmission in a first slot in response to detecting the demodulation reference signal in the first slot, and determining, by the base station, that the UE performs the uplink transmission outside of the first slot in response to detecting the demodulation reference signal outside of the first slot.

In an additional aspect of the disclosure, an apparatus configured for wireless communication includes means for detecting, by the base station, a successful LBT procedure over a shared spectrum, wherein the successful LBT procedure is detected at a first transmission start point after a subframe boundary, means for precoding, by the base station, a first block of data for transmission to a UE over available transmission resource elements in an initial partial subframe from the first transmission start point to a next subframe boundary, means for puncturing, by the base station, a set of resource elements of the available transmission resource elements with the preceded first block of data, wherein the puncturing is uniform over time and frequency of the initial partial subframe, and means for transmitting, by the base station, the precoded first block of data over the available transmission resource elements to the UE.

In an additional aspect of the disclosure, an apparatus configured for wireless communication includes means for monitoring, by a UE, for a downlink grant from a serving base station in a first symbol of a first slot of a subframe, means for receiving, by the UE, downlink data from the serving base station over a set of downlink transmission resources of the subframe identified by the downlink grant in response to detection of the downlink grant in the first symbol of the first slot, means for monitoring, by the UE, for a plurality of downlink grants from the serving base station in a first symbol of a second slot of the subframe in response to failure to detect the downlink grant in the first symbol of the first slot, and means for receiving, by the UE, the downlink data from the serving base station over a plurality of sets of downlink transmission resources associated with each of the plurality of downlink grants detected in the first symbol of the second slot.

In an additional aspect of the disclosure, an apparatus configured for wireless communication includes means for receiving, by a UE from a serving base station, a first uplink configuration associated with uplink transmission for a full subframe and a second uplink configuration associated with uplink transmission for a partial subframe, means for determining, by the UE, transmission status of an ending transmission of an ending uplink subframe, means for transmitting the ending transmission according to the first uplink configuration when the transmission status indicates a full subframe transmission, and means for transmitting the ending transmission according to the second uplink configuration when the transmission status indicates a partial subframe status.

In an additional aspect of the disclosure, an apparatus configured for wireless communication includes means for receiving, at a UE from a serving base station, downlink control information identifying an uplink transmission start in a second slot of a subframe, means for receiving, at the UE from the serving base station, an uplink configuration for transmission over a partial subframe, and means for transmitting, by the UE, uplink data over the partial subframe in the second slot according to the uplink configuration.

In an additional aspect of the disclosure, an apparatus configured for wireless communication includes means for receiving, at a UE from a serving base station, an uplink grant identifying an uplink transmission over a full length of a subframe, means for detecting, by the UE, failure of a LBT procedure for transmission over the full length of the subframe, means for detecting by the UE, success of a next LBT procedure at a subsequent symbol of the subframe, and means for transmitting, by the UE, uplink data in a starting symbol of the subframe after the success of the next LBT procedure.

In an additional aspect of the disclosure, an apparatus configured for wireless communication includes means for sending, by a base station, an uplink grant to a user equipment, wherein the uplink grant identifies uplink transmission for a full length of a subframe, means for monitoring, by the base station, for a demodulation reference signal transmitted by the UE, means for determining, by the base station, that the UE performs the uplink transmission in a first slot in response to detecting the demodulation reference signal in the first slot, and means for determining, by the base station, that the UE performs the uplink transmission outside of the first slot in response to detecting the demodulation reference signal outside of the first slot.

In an additional aspect of the disclosure, a non-transitory computer-readable medium having program code recorded thereon. The program code further includes code to detect, by the base station, a successful LBT procedure over a shared spectrum, wherein the successful LBT procedure is detected at a first transmission start point after a subframe boundary, code to precede, by the base station, a first block of data for transmission to a UE over available transmission resource elements in an initial partial subframe from the first transmission start point to a next subframe boundary, code to puncture, by the base station, a set of resource elements of the available transmission resource elements with the preceded first block of data, wherein the puncturing is uniform over time and frequency of the initial partial subframe, and code to transmit, by the base station, the precoded first block of data over the available transmission resource elements to the UE.

In an additional aspect of the disclosure, a non-transitory computer-readable medium having program code recorded thereon. The program code further includes code to monitor, by a UE, for a downlink grant from a serving base station in a first symbol of a first slot of a subframe, code to receive, by the UE, downlink data from the serving base station over a set of downlink transmission resources of the subframe identified by the downlink grant in response to detection of the downlink grant in the first symbol of the first slot, code to monitor, by the UE, for a plurality of downlink grants from the serving base station in a first symbol of a second slot of the subframe in response to failure to detect the downlink grant in the first symbol of the first slot, and code to receive, by the UE, the downlink data from the serving base station over a plurality of sets of downlink transmission resources associated with each of the plurality of downlink grants detected in the first symbol of the second slot.

In an additional aspect of the disclosure, a non-transitory computer-readable medium having program code recorded thereon. The program code further includes code to receive, by a UE from a serving base station, a first uplink configuration associated with uplink transmission for a full subframe and a second uplink configuration associated with uplink transmission for a partial subframe, code to determine, by the UE, transmission status of an ending transmission of an ending uplink subframe, code to transmit the ending transmission according to the first uplink configuration when the transmission status indicates a full subframe transmission, and code to transmit the ending transmission according to the second uplink configuration when the transmission status indicates a partial subframe status.

In an additional aspect of the disclosure, a non-transitory computer-readable medium having program code recorded thereon. The program code further includes code to receive, at a UE from a serving base station, downlink control information identifying an uplink transmission start in a second slot of a subframe, code to receive, at the UE from the serving base station, an uplink configuration for transmission over a partial subframe, and code to transmit, by the UE, uplink data over the partial subframe in the second slot according to the uplink configuration.

In an additional aspect of the disclosure, a non-transitory computer-readable medium having program code recorded thereon. The program code further includes code to receive, at a UE from a serving base station, an uplink grant identifying an uplink transmission over a full length of a subframe, code to detect, by the UE, failure of a LBT procedure for transmission over the full length of the subframe, code to detect by the UE, success of a next LBT procedure at a subsequent symbol of the subframe, and code to transmit, by the UE, uplink data in a starting symbol of the subframe after the success of the next LBT procedure.

In an additional aspect of the disclosure, a non-transitory computer-readable medium having program code recorded thereon. The program code further includes code to send, by a base station, an uplink grant to a user equipment, wherein the uplink grant identifies uplink transmission for a full length of a subframe, code to monitor, by the base station, for a demodulation reference signal transmitted by the UE, code to determine, by the base station, that the UE performs the uplink transmission in a first slot in response to detecting the demodulation reference signal in the first slot, and code to determine, by the base station, that the UE performs the uplink transmission outside of the first slot in response to detecting the demodulation reference signal outside of the first slot.

In an additional aspect of the disclosure, an apparatus configured for wireless communication is disclosed. The apparatus includes at least one processor, and a memory coupled to the processor. The processor is configured to detect, by the base station, a successful LBT procedure over a shared spectrum, wherein the successful LBT procedure is detected at a first transmission start point after a subframe boundary, to precode, by the base station, a first block of data for transmission to a UE over available transmission resource elements in an initial partial subframe from the first transmission start point to a next subframe boundary, to puncture, by the base station, a set of resource elements of the available transmission resource elements with the precoded first block of data, wherein the puncturing is uniform over time and frequency of the initial partial subframe, and to transmit, by the base station, the precoded first block of data over the available transmission resource elements to the UE.

In an additional aspect of the disclosure, an apparatus configured for wireless communication is disclosed. The apparatus includes at least one processor, and a memory coupled to the processor. The processor is configured to monitor, by a UE, for a downlink grant from a serving base station in a first symbol of a first slot of a subframe, to receive, by the UE, downlink data from the serving base station over a set of downlink transmission resources of the subframe identified by the downlink grant in response to detection of the downlink grant in the first symbol of the first slot, to monitor, by the UE, for a plurality of downlink grants from the serving base station in a first symbol of a second slot of the subframe in response to failure to detect the downlink grant in the first symbol of the first slot, and to receive, by the UE, the downlink data from the serving base station over a plurality of sets of downlink transmission resources associated with each of the plurality of downlink grants detected in the first symbol of the second slot.

In an additional aspect of the disclosure, an apparatus configured for wireless communication is disclosed. The apparatus includes at least one processor, and a memory coupled to the processor. The processor is configured to receive, by a UE from a serving base station, a first uplink configuration associated with uplink transmission for a full subframe and a second uplink configuration associated with uplink transmission for a partial subframe, to determine, by the UE, transmission status of an ending transmission of an ending uplink subframe, to transmit the ending transmission according to the first uplink configuration when the transmission status indicates a full subframe transmission, and to transmit the ending transmission according to the second uplink configuration when the transmission status indicates a partial subframe status.

In an additional aspect of the disclosure, an apparatus configured for wireless communication is disclosed. The apparatus includes at least one processor, and a memory coupled to the processor. The processor is configured to receive, at a UE from a serving base station, downlink control information identifying an uplink transmission start in a second slot of a subframe, to receive, at the UE from the serving base station, an uplink configuration for transmission over a partial subframe, and to transmit, by the UE, uplink data over the partial subframe in the second slot according to the uplink configuration.

In an additional aspect of the disclosure, an apparatus configured for wireless communication is disclosed. The apparatus includes at least one processor, and a memory coupled to the processor. The processor is configured to receive, at a UE from a serving base station, an uplink grant identifying an uplink transmission over a full length of a subframe, to detect, by the UE, failure of a LBT procedure for transmission over the full length of the subframe, to detect by the UE, success of a next LBT procedure at a subsequent symbol of the subframe, and to transmit, by the UE, uplink data in a starting symbol of the subframe after the success of the next LBT procedure.

In an additional aspect of the disclosure, an apparatus configured for wireless communication is disclosed. The apparatus includes at least one processor, and a memory coupled to the processor. The processor is configured to send, by a base station, an uplink grant to a user equipment, wherein the uplink grant identifies uplink transmission for a full length of a subframe, to monitor, by the base station, for a demodulation reference signal transmitted by the UE, to determine, by the base station, that the UE performs the uplink transmission in a first slot in response to detecting the demodulation reference signal in the first slot, and to determine, by the base station, that the UE performs the uplink transmission outside of the first slot in response to detecting the demodulation reference signal outside of the first slot.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
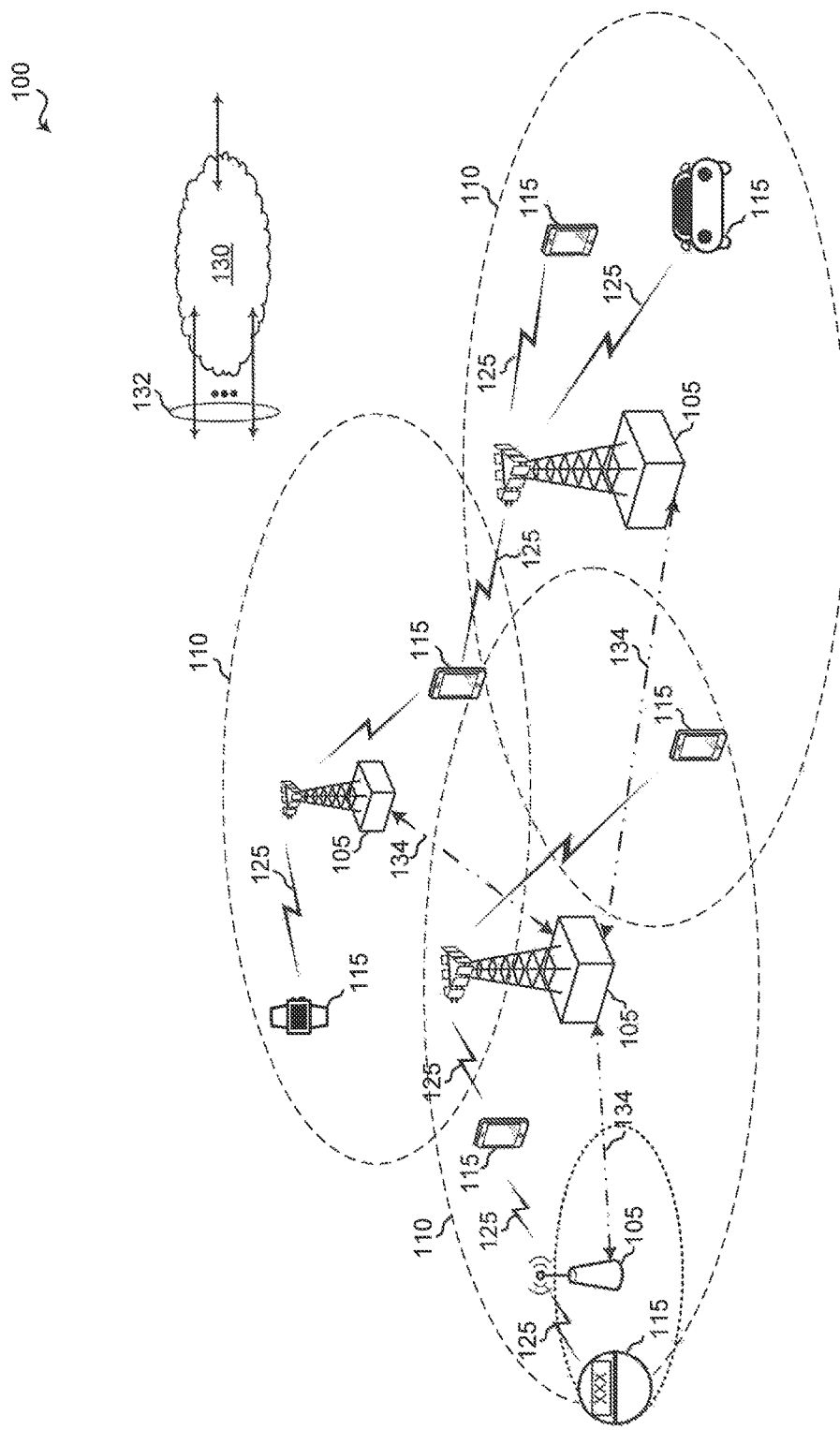
FIG. 1 is a block diagram illustrating details of a wireless communication system.

The described techniques relate to improved methods, systems, devices, or apparatuses that support partial subframe transmission techniques in shared radio frequency spectrum. As indicated above, in some cases, unlicensed radio frequency spectrum bands may be used for Long Term Evolution (LTE), LTE-Advanced (LTE-A), or new radio (NR) communications. Unlicensed radio frequency spectrum may be used in combination with, or independent from, a dedicated or licensed radio frequency spectrum band. The dedicated radio frequency spectrum band may include a radio frequency spectrum band licensed to particular users for particular uses. The unlicensed or shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner and may be accessed through contention-based access procedures. The terms unlicensed radio frequency spectrum and shared radio frequency spectrum are used interchangeably herein.

In some cases, a base station may schedule a user equipment (UE) for downlink and uplink communications through an assignment or grant of resources. However, due to contention-based access, the timing of when a base station or UE has access to shared radio frequency spectrum may not be known until a contention-based access procedure (e.g., a listen-before-talk (LBT) procedure) is completed. Furthermore, in some cases, subframe timing between multiple transmitters that use the shared radio frequency spectrum may be synchronized, and thus time gaps may be present between completion of an LBT procedure and a subsequent start of a subframe. Techniques discussed herein provide for efficient scheduling and transmissions following a successful contention-based access procedure, which may enhance the efficiency of a network that uses shared radio frequency spectrum.

In some cases, a base station may identify of a starting location for a transmission and initiate the transmission in a relatively short time period between completion of a successful LBT procedure and transmission of data between the base station and a UE. In the event that an LBT procedure is successfully completed after the start of a subframe, an indication of a transmission may be transmitted at one of a number of predetermined points within the subframe time duration. In some cases, two or more different partial subframe durations may be configured, and one or more different partial subframes may be used for transmissions until the start of a subsequent subframe.

In some cases, a base station may provide an uplink grant to a UE, and the UE may start uplink transmissions based on an established timing between receiving the uplink grant and the start of the uplink transmissions. The uplink grant, in some cases, may be transmitted using a partial subframe, which may allow a UE to start uplink transmissions sooner than uplink transmissions would be started if the uplink grant were transmitted using a full subframe. In some cases, an uplink grant may be provided to a UE, and a separate trigger may be transmitted to initiate the uplink transmission, and the trigger may be transmitted in a partial subframe and may include an indication of a starting or ending position, or both, of the uplink transmission.

Aspects of the disclosure are initially described in the context of a wireless communications system. Aspects of the disclosure are further illustrated by and described with reference to apparatus diagrams, system diagrams, and flowcharts that relate to partial subframe transmission techniques in shared radio frequency spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may be an example of a system that supports partial subframe transmissions in shared radio frequency spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., SI, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105, or, in NR networks, next generation eNBs (gNBs).

A base station 105 may be connected by an SI interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures (such as a clear channel assessment (CCA)) to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A CCA may include an energy detection or energy sensing procedure to determine whether there are any other active transmissions. For example, each base station 105 or UE 115 may randomly choose a backoff counter (with may be a certain duration or a number of symbols) and listen to a channel including resources that are being contended for until the counter decrements to zero. If the counter reaches zero for a certain base station 105 or UE 115 and no other transmissions are detected, the base station 105 or UE 115 may start transmitting. If the counter does not reach zero before another signal is detected, the device has lost contention for resource and refrains from transmitting.

As indicated above, in some cases base stations 105 and UEs 115 may transmit according to synchronized subframes across devices. However, due to contention-based access, the timing of when a base station 105 or UE 115 has access to shared radio frequency spectrum may not be known until a LBT procedure is completed. In some cases, a base station 105 may identify a starting location for a transmission and initiate the transmission in a relatively short time period between completion of a successful LBT procedure and transmission of data between the base station 105 and a UE 115. In the event that an LBT procedure is successfully completed after the start of a subframe, an indication of a transmission may be transmitted at one of a number of predetermined points (e.g., using a common reference signal (CRS) transmission or a demodulation reference signal (DMRS) transmission) within the subframe time duration. In some cases, two or more different partial subframe durations may be configured, and one or more different partial subframes may be used for transmissions until the start of a subsequent subframe.

In some cases, a base station 105 may provide an uplink grant to a UE 115, and the UE 115 may start uplink transmissions based on an established timing between receiving the uplink grant and the start of the uplink transmissions. The uplink grant may, in some cases, be transmitted using a partial subframe, which may allow a UE 115 to start uplink transmissions sooner than uplink transmissions would be started if the uplink grant were transmitted using a full subframe. In some cases, an uplink grant may be provided to a UE 115, and a separate trigger may be transmitted to initiate the uplink transmission, and the trigger may be transmitted in a partial subframe and may include an indication of a starting or ending position, or both, of the uplink transmission.

Figure 2:
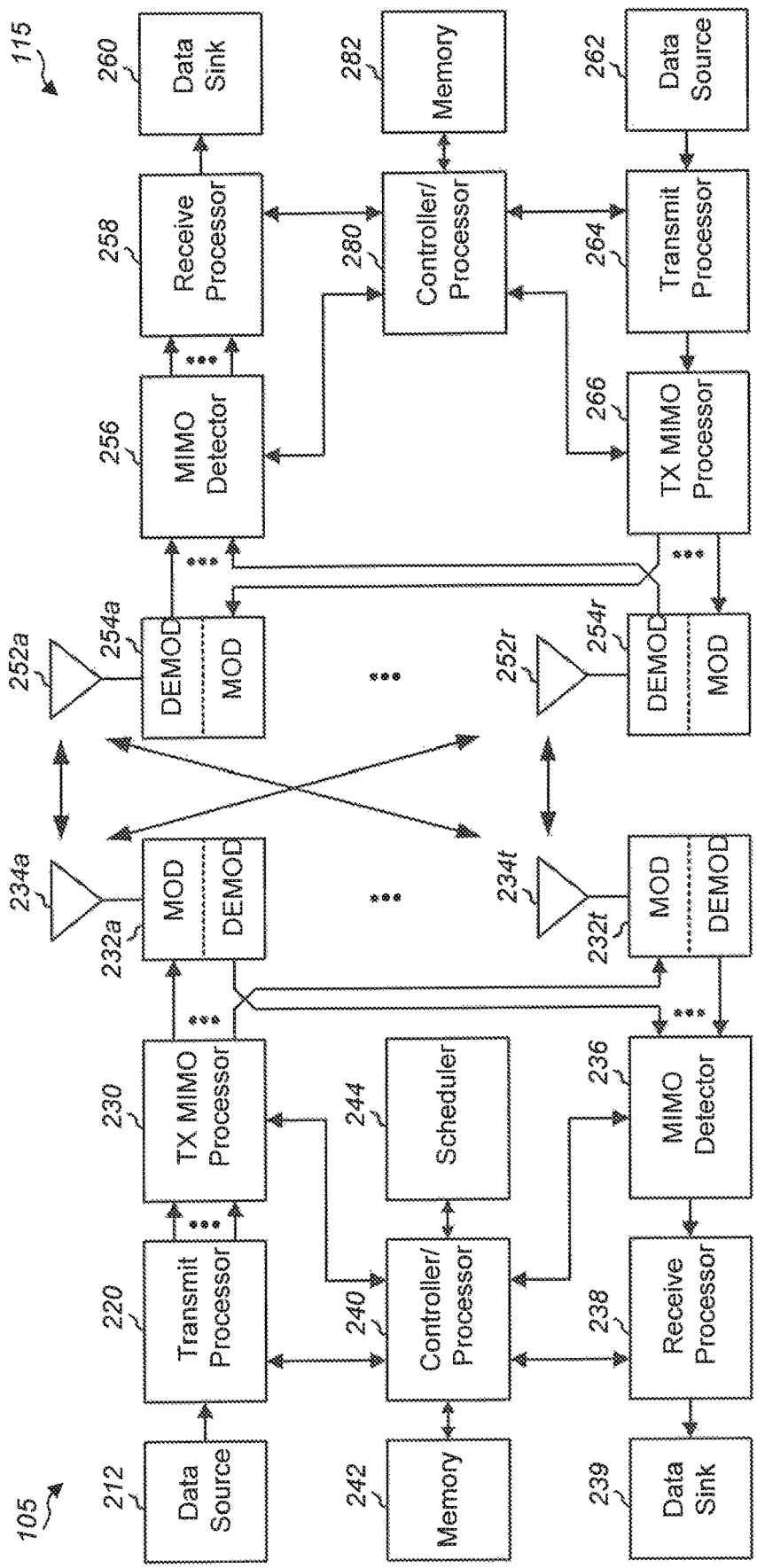
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 6, 8, 9, 10A, and 10B, and/or other processes for the techniques described herein. The memories 242 and 282 may store data and program codes for the base station 105 and the UE 115, respectively. A scheduler 244 may schedule UEs for data transmission on the downlink and/or uplink.

Figure 3:
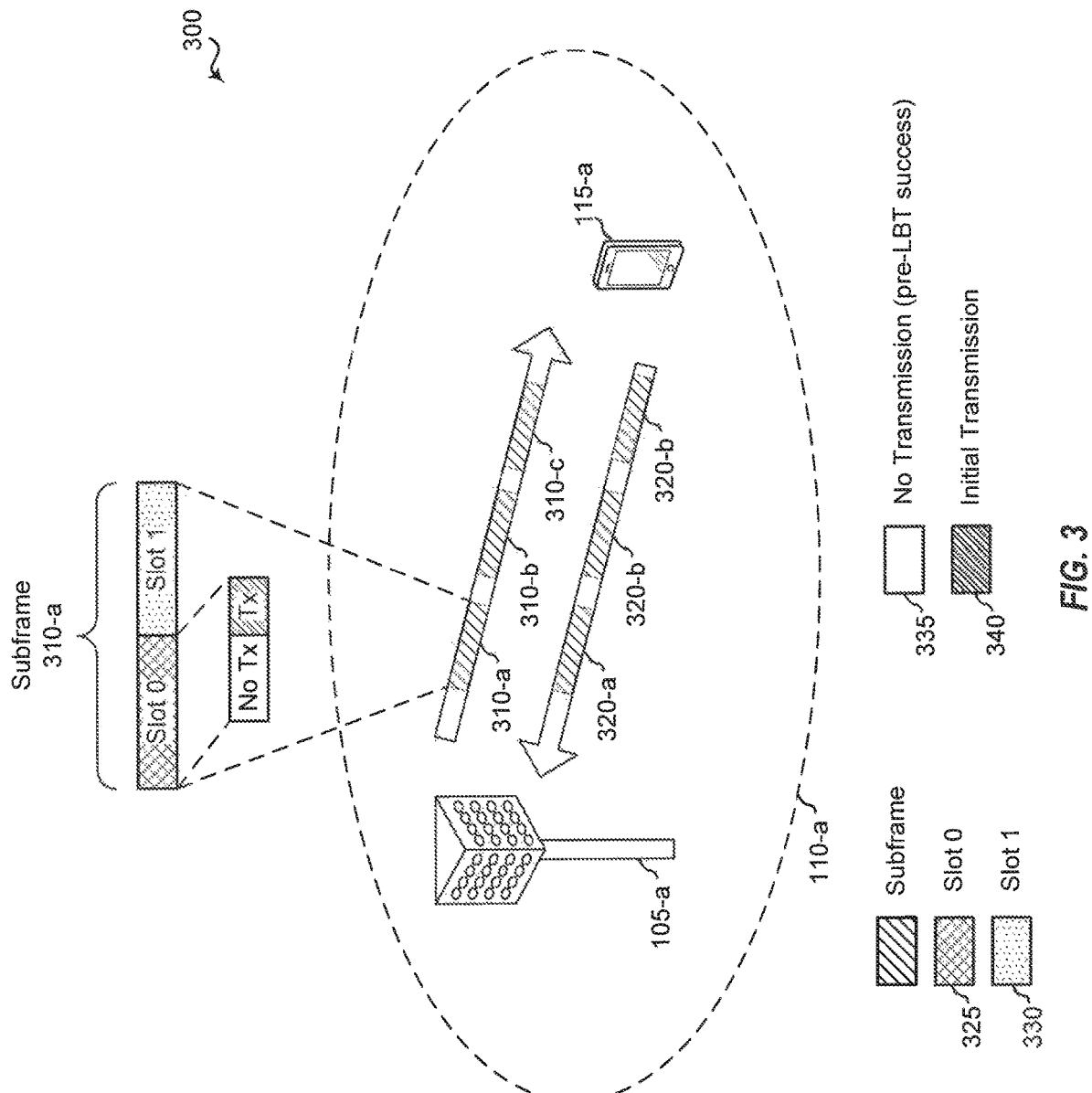
FIG. 3 illustrates an example of a timing diagram for coordinated resource partitioning.

FIG. 3 illustrates an example of a wireless communications system 300 that supports partial subframe transmission techniques in shared radio frequency spectrum in accordance with various aspects of the present disclosure. Wireless communications system 300 includes a base station 105-a and a UE 115-a, which may be examples of aspects of a base station 105 or UE 115 as described above with reference to FIGS. 1 and 2. In the example of FIG. 3, the wireless communications system 300 may operate according to a radio access technology (RAT) such as a LTE, 5G, or NR RAT, although techniques described herein may be applied to any RAT and to systems that may concurrently use two or more different RATs.

The base station 105-a may communicate with UE 115-a, and one or more other UEs within a coverage area 110-a of the base station 105-a, over a downlink carrier 305 and an uplink carrier 315. In some examples, the base station 105-a may allocate resources for communication with UE 115-a over downlink carrier 305 and uplink carrier 315. For example, base station 105-a may allocate downlink subframes 310 in downlink carrier 305 for downlink transmissions from UE 115-a, and one or more downlink subframes 310 may correspond to a TTI of 1 ms. In this example, downlink subframes 310 may include a first downlink subframe 310-*a*, a second downlink subframe 310-*b*, and a third downlink subframe 310-*c*. Each of the downlink subframes 310 may include two slots, in which each slot may have seven OFDM symbols for a normal cyclic prefix. In this example, a first slot (slot 0) 325 and a second slot (slot 1) 330 may be included in the first subframe 310-*a*. Similar transmission resources may be allocated in uplink carrier 315 for uplink subframes 320.

As indicated above, in some cases an LBT procedure may result in the base station 105-*a* gaining channel access between starting points of consecutive downlink subframes 310. In the example of FIG. 3, within the first slot 325, the base station 105-*a* may complete an LBT procedure and gain channel access and begin transmissions at some point after the start of the downlink subframe. Thus, within the first slot 325, there may be a period 335 with no transmissions, followed by an initial transmission 340 that begins between consecutive starting locations of consecutive downlink subframes 310. While this example shows the initial transmission 340 starting within the first slot 325, in other examples the initial transmission 340 may start at a starting point of the second slot 330, or after the start of the second slot 330.

In some cases, base station 105-*a* may configure two or more partial subframe durations to accommodate different starting times of the initial transmission 340. For example, the base station 105-*a* may configure a first partial subframe duration that corresponds to three OFDM symbols, and a second partial subframe duration that corresponds to a slot duration. Thus, in the event that initial transmission 340 starts within the first slot 325, a first partial subframe may be transmitted with the first partial subframe duration, followed by a transmission of a second partial subframe with the second partial subframe duration, which may then be followed by one or more full subframes having a full subframe duration. In some cases, predefined potential starting points for a partial subframe transmission may be configured by the base station 105-*b*. In some cases, the potential starting points correspond to OFDM symbols within a subframe that may be used to transmit a cell-specific reference signal (CRS). Thus, UE 115-*a* may monitor for CRS in the configured symbols and, upon detection of CRS, may determine that a partial subframe is being transmitted. Additionally or alternatively, the potential starting points correspond to OFDM symbols within a subframe that contain a demodulation reference signal (DMRS). Thus, UE 115-*a* may monitor for DMRS and/or CRS in configured symbols and, upon detection of CRS/DMRS, may determine that a partial subframe is being transmitted.

Various design options and configurations may be applied for downlink and uplink partial subframes in shared spectrum environments, such as LAA and the like. In current standards discussions, additional downlink starting points for initial partial subframes has been discussed, as well as at least one additional uplink starting point and at least one additional uplink ending point for initial and ending partial uplink subframes.

In one option for downlink initial partial subframes, specific symbols may be configured for starting points for downlink transmissions (e.g., symbols 0, 4, 7, and 11). Such a design may be similar to existing LAA initial partial subframes in which no transport block size scaling occurs, but rate matching is performed to fit the number of symbols in the partial subframe.

Another option for downlink initial partial subframes provides for staring points at other symbols that are consistent with the short TTI start symbols. In such options, the PDCCH points to the start of transmission which would last until the end of the partial subframe.

In still another option for downlink initial partial subframes, the PDCCH may indicate the start of the PDSCH, which may occur in any position or positions within the subframe, while PDCCH would be transmitted at the first symbol of the first slot of the subframe (e.g., symbol 0) and the first symbol of the second slot of the subframe (e.g., symbol 7). Such an option also provides for PDSCH rate matching around the symbols carrying the PDCCH.

In such options, there are potential issues with the degree of processing complexity at the base stations. For example, when the base station determines a successful LBT after the subframe boundary, it would perform another LBT to determine whether it may transmit at the next available starting time. In addition to the uncertainty of whether the subsequent LBT procedure would be successful, the base station would also start to precoding the data again for transmission over the remaining resource elements of the partial subframe. If, for example, the base station precodes the data again assuming a partial subframe beginning at symbol 3 of the first slot, but fails the subsequent LBT, which leaves the next transmit opportunity at symbol 7. The base station would again begin a next LBT procedure and begin preceding the data again for the remaining resource elements from symbol 7 to the end of the partial frame. As such, several series of precoding and re-precoding, which entails processes such as grouping coded bits of the data into code blocks, assembling the code blocks into transport blocks, modulating the transport blocks and then preceding the transmission packets.

Moreover, when rate matching is applied which shifts transport blocks over different resource blocks (RBs), the complexity increases again, as different preceding is often employed over difference RBs. Accordingly, various aspects of the present disclosure are directed to reducing the complexity of base station processing while maintaining flexibility of different starting points in downlink initial partial subframes.

Figure 4:
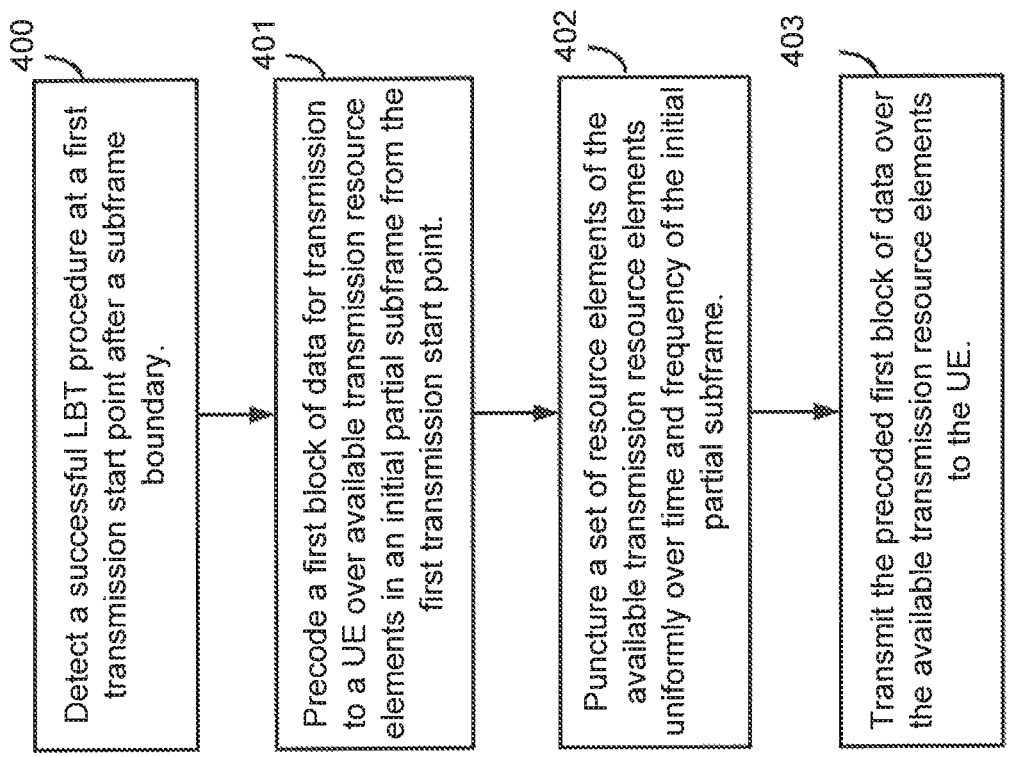
FIG. 4 is a block diagram illustrating example blocks executed to implement one aspect of the present disclosure.
Figure 11:
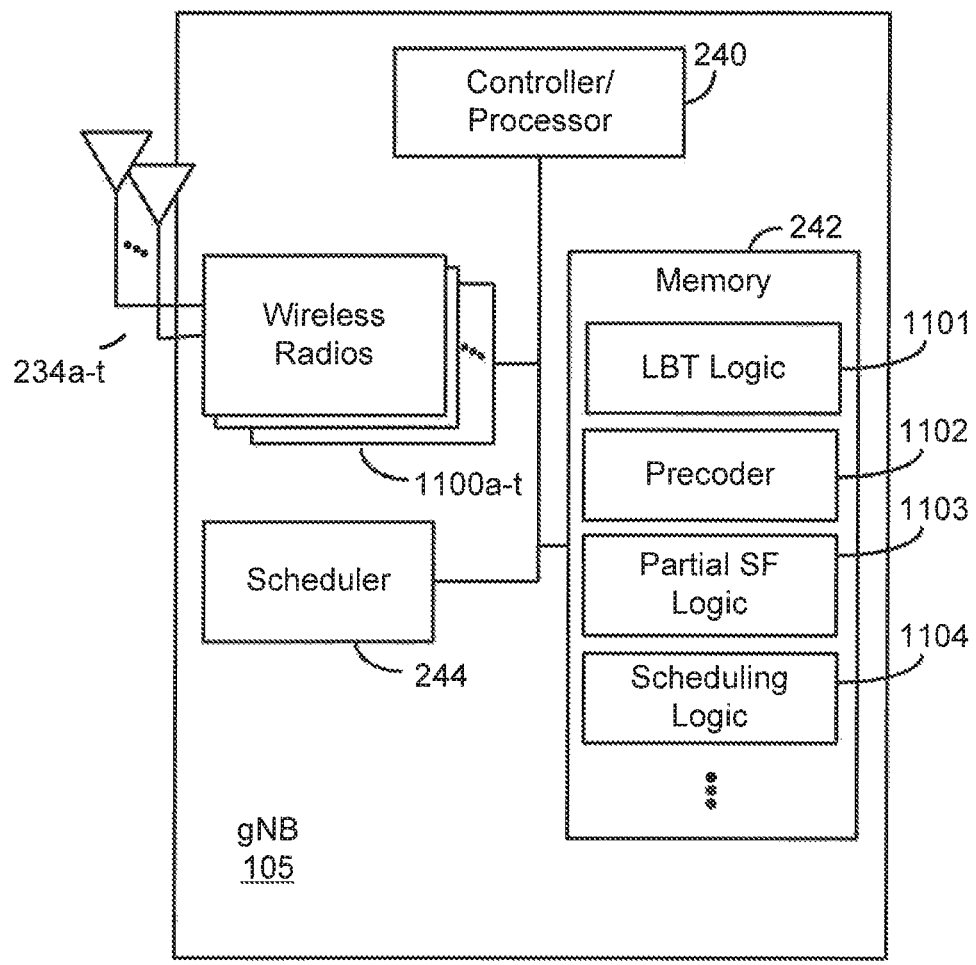
FIG. 11 is a block diagram illustrating an example base station configured according to one aspect of the present disclosure.

FIG. 4 is a block diagram illustrating example blocks executed to implement one aspect of the present disclosure. The example blocks will also be described with respect to gNB 105 as illustrated in FIG. 11. FIG. 11 is a block diagram illustrating gNB 105 configured according to one aspect of the present disclosure. gNB 105 includes the structure, hardware, and components as illustrated for eNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 1100*a-t* and antennas 234*a-t*. Wireless radios 1100*a-t* includes various components and hardware, as illustrated in FIG. 2 for gNB 105, including modulator/demodulators 232*a-t*, MIMO detector 236, receive processor 238, transmit processor 220, and TX MIMO processor 230.

At block 400, a base station detects a successful LBT procedure at a first transmission start point after a subframe boundary. The LBT procedure is performed by the base station over a shared spectrum. For example, when preparing for transmissions, the base station, such as gNB 105, under control of controller/processor 240, executes LBT logic 1101, stored in memory 242. The execution environment of LBT logic 1101 triggers gNB 105 to perform an LBT procedure. When gNB 105 detects that the LBT procedure has been successful, it may secure the channel.

At block 401, the base station precodes a first block of data for transmission to a UE over available transmission resource elements in an initial partial subframe from the first transmission start point. For example, gNB 105, under control of controller/processor 240, assembles coded bits into code blocks, transport blocks, modulates the transport blocks, using the componentry with wireless radios 1100*a-t*, and then precodes the data, through execution of precoder 1102, stored in memory 242, in preparation for transmission.

At block 402, the base station punctures a set of resource elements of the available transmission resource elements uniformly over time and frequency of the initial partial subframe. As preparation for transmission when the network is configured for partial subframe transmissions, the base station, such as gNB 105, under control of controller/processor 240, executes partial subframe (SF) logic 1103, stored in memory 242. The execution environment of partial SF logic 1103 allows gNB 105 to monitor transmissions for any partial subframe opportunities. With the available set of resources remaining in the subframe making up the initial partial subframe, the execution environment of partial SF logic would allow gNB 105 to puncture a set of resource elements in a pattern to reduce the overall number of resource elements that may be used for downlink transmissions (e.g., PDSCH resource elements). The execution environment of partial SF logic 1103 provides for gNB 105 to select a pattern for puncturing that may include accommodation for the locations of various control signals, such as channel state information (CSI) reference signals (CSI-RS), CRS, DMRS, and the like. Moreover, under certain transmission modes, such as transmission modes that support space frequency block coding (SFBC), the pattern selected by gNB 105 may be grouped by pairs or in groups of 4, so as to preserve the SFBC grouping in the downlink transmissions.

Because downlink mapping in LTE and other OFDM RATs maps frequency first and then time, puncturing only a few OFDM symbols at the beginning of the initial partial subframe may cause some code blocks to be full lost, which may result in no possibility of recovering enough to decode the associated transport blocks. Thus, the systematic 2-dimensional interleaved puncturing, after which the remaining tones of the partial subframe are compressed for transmission may allow for the possibility of decoding some transport block, as the code blocks may be punctured over both frequency and time may allow the punctured information to be recovered via parity checks or other such error checking procedures. At block 403, the base station transmits the precoded first block of data over the available transmission resource elements to the UE. For example, gNB 105 would transmit the precoded first block of data using the available transmission REs via wireless radios 1100*a-t* and antennas 234*a-t*.

Figure 5B:
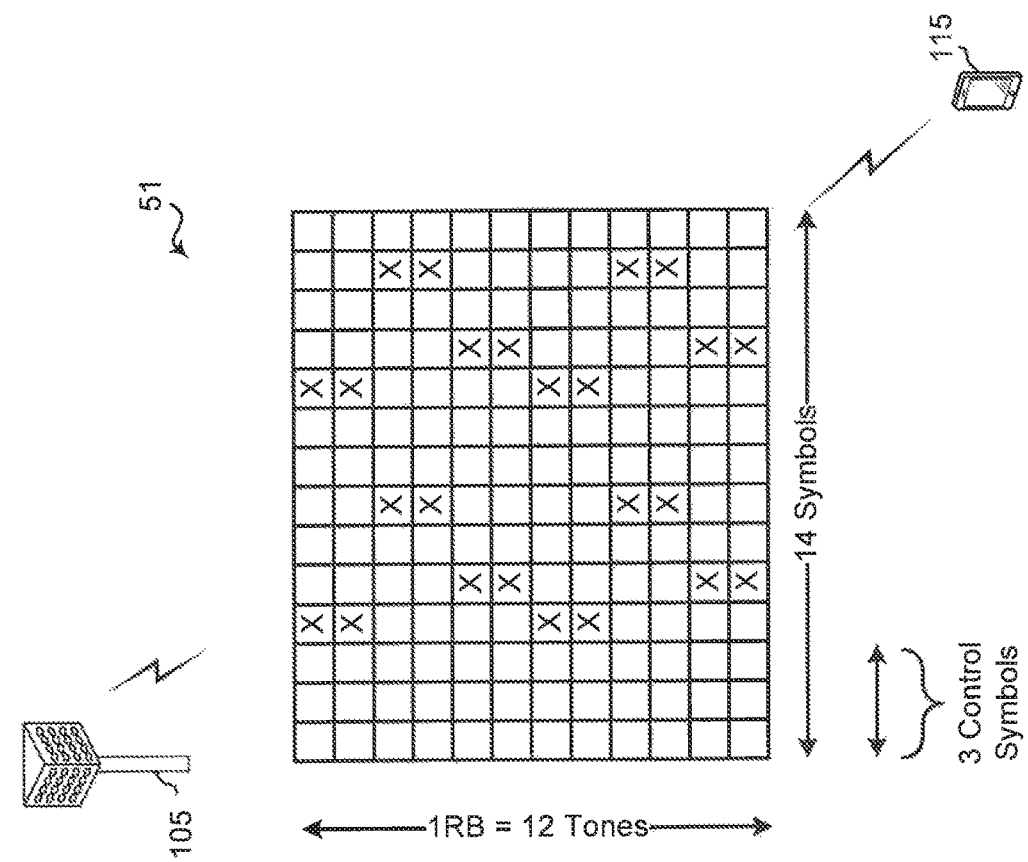
FIGS. 5A and 5B are block diagrams illustrating a resource block (RB) communicated between a base station and UE configured according to aspects of the present disclosure.
Figure 5A:
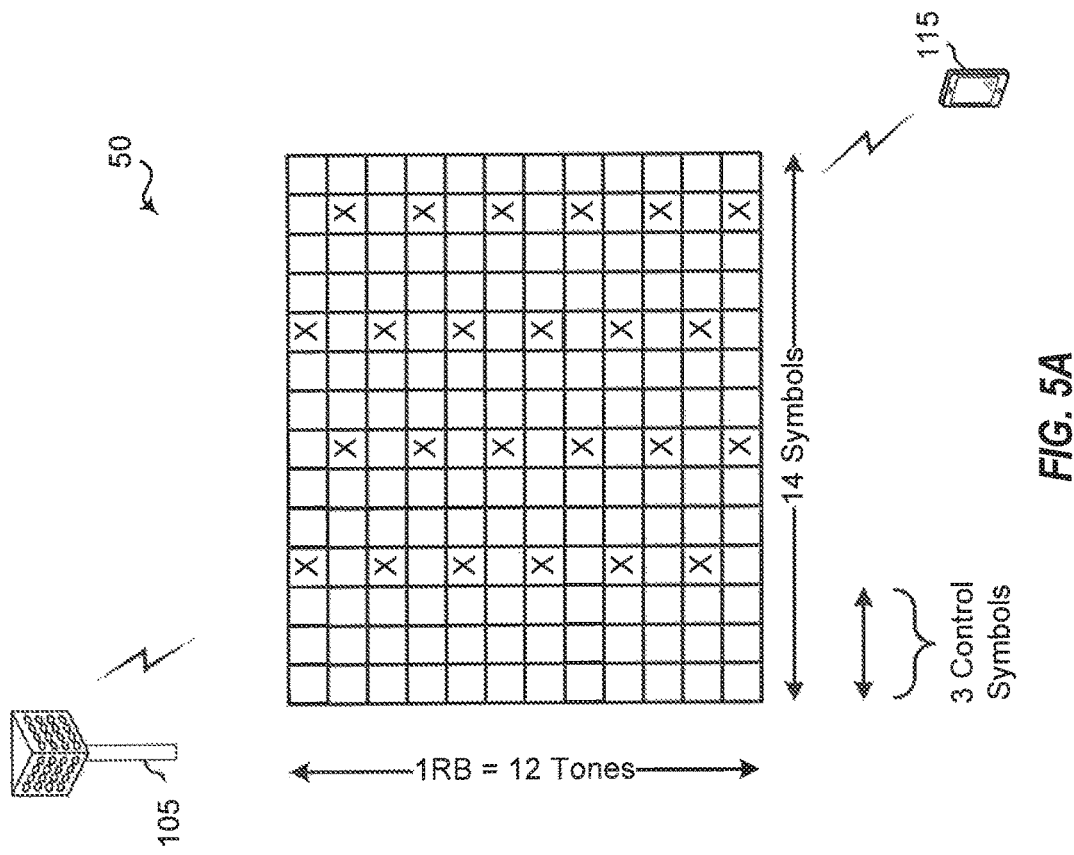

FIG. 5A is a block diagram illustrating a resource block (RB) 50 communicated between a base station 105 and UE 115 configured according to one aspect of the present disclosure. As noted above, when LBT is successful after a subframe boundary and downlink communication between base station 105 and UE 115 occurs via an initial partial subframe, uniform puncturing may be used to reduce the number of resources available for PDSCH while maintaining the precoding of the available transmission resource elements within the same RB, RB 50. In the illustrated example, downlink transmission may start at the fourth symbol. The resource elements identified with an 'X' have been punctured, thus, reducing the number of resource elements available for PDSCH. The pattern of resource elements punctured in RB 50 have been selected to avoid the locations of any reference signals, such as CSI-RS, CRS, DMRS, and the like. The set of resource elements remaining for PDSCH may be compressed within RB 50, which allows base station 105 to maintain the same preceding originally determined for the full subframe downlink transmission.

FIG. 5B is a block diagram illustrating a RB 51 communicated between base station 105 and UE 115 configured according to another aspect of the present disclosure. In a special case of the uniform puncturing solution, the transmission mode supports SFBC transmissions. In such a special case, base station 105 selects a pattern that groups the punctured resource elements in pairs across time and frequency. In such a pattern, the punctured resources avoids the SFBC groupings, as noted above.

It should be noted that with the uniform puncturing aspects for downlink initial partial subframes configured according to the various aspects of the present disclosure, there is no necessity to update or continue to precede the data as a downlink transmission starting point may change based on LBT failure, data preparation, or the like. For example, with transmission mode 4 or 8, precoding of transmission data occurs on a per-RB basis. Thus, each RB in transmission mode 8 (e.g.,) has a different precoding mechanism. The receiving UEs are unaware of this preceding of the transmitted data, instead relying on analysis of the DMRS received first from the base station. The UE would estimate the DMRS channel and use that channel estimation to determine the preceding that has been used both with the DMRS and the transmitted data.

If the base station were to, instead, use a rate matching to prepare the data for transmission over the fewer available resource elements of the initial partial subframe, each time the starting point may change, the base station would re-precede all of the data for the new number of resource elements available for PDSCH. When rate matching, the position of the REs for the underlying transmission are no longer fixed to the RB. REs may be split across multiple RBs in order to accommodate the transmission. Therefore, not only would the base station using rate matching continue to re-precode data as the starting point changes, but the base station would use different precoding for the different RBs. The resulting complexity in such scenarios would increase greatly for the base stations. In contrast, the uniform puncturing of resource elements to reduce the number of REs available for transmission in the initial partial subframe, the same precoding would be applicable across the transmitted data in the same RB.

Additional aspects of the present disclosure are directed to identifying additional starting points for downlink transmission in initial partial subframes. In such aspects, the PDCCH points to the start of one or more short PDSCH in the partial subframe. The PDSCH would be based on the short PDSCH transmissions defined in the standards discussions of short TTIs. Short TTIs all for multiple PDSCH transmissions in the same partial subframe with different start positions. The different starting positions may be defined based on the associated short TTI and signaled in the PDCCH with multiple grants. The UE would monitor for PDCCH with regular DCI when control transmission starts in the first symbol of the first slot of the full subframe (e.g., symbol 0), while the UE would monitor for PDCCH with the new DCI formats (which may indicate short PDSCH-related information) when control transmission starts in the first symbol of the second slot of the full subframe (e.g., symbol 7). The UE may receive multiple PDCCHs for the short PDSCH.

Figure 6:
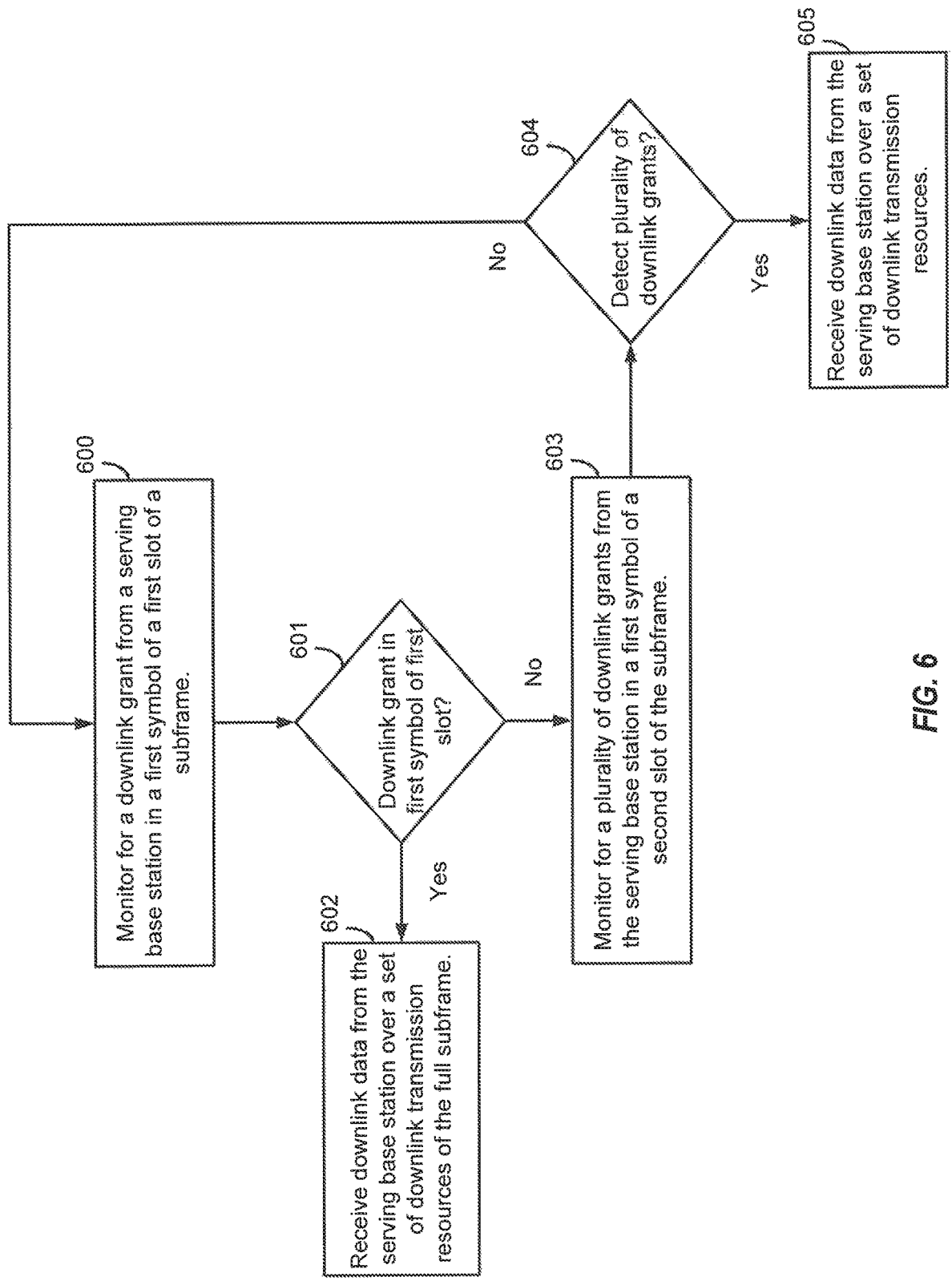
FIG. 6 is a block diagram illustrating example blocks executed to implement one aspect of the present disclosure.
Figure 12:
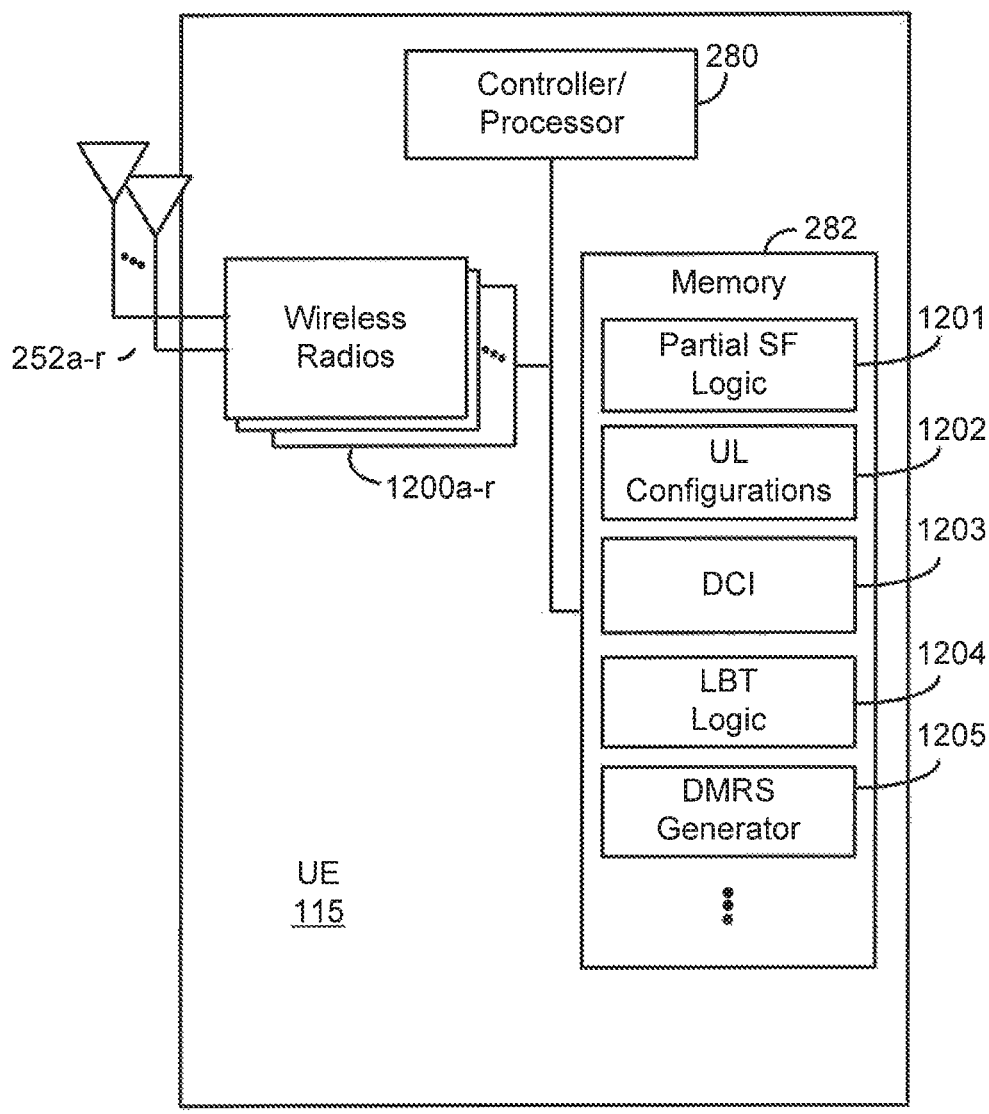
FIG. 12 is a block diagram illustrating an example UE configured according to one aspect of the present disclosure.

FIG. 6 is a block diagram illustrating example blocks executed to implement one aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200a-r and antennas 252a-r. Wireless radios 1200a-r includes various components and hardware, as illustrated in FIG. 2 for UE 115, including modulator/demodulators 254a-r, MIMO detector 256, receive processor 258, transmit processor 264, and TX MIMO processor 266.

At block 600, a UE monitors for a downlink grant from a serving base station in a first symbol of a first slot of a subframe. For example, UE 115, under control of controller/processor 280, monitors signals received via antennas 252a-r and wireless radios 1200a-r to detect downlink grants from a serving base station. With the network configured for transmissions over partial subframes, UE 115, under control of controller/processor 280, would also execute partial SF logic 1201, stored in memory 282. The execution environment of partial SR logic 1201 allows for UE 115 to monitors transmissions for transmission opportunities that may be using a partial subframe.

At block 601, a determination is made by the UE whether a downlink grant was received at the first symbol of the first slot. As downlink grants may be detected by UE 115, the execution environment of partial SF logic 1201 provides for monitoring when such downlink grants arrive in order to determine whether the downlink transmissions will be full subframe or partial subframe. If so, then, at block 602, the UE receives downlink data from the serving base station over a set of downlink transmission resources of the full subframe. If the downlink grant is detected by UE 115 in the first symbol of the first slot of the subframe, the entire subframe may be scheduled for downlink transmissions.

At block 603, if the UE fails to detect the downlink grant in the first symbol of the first slot at block 602, the UE monitors for a plurality of downlink grants from the serving base station in a first symbol of a second slot of the subframe. The execution environment of partial SF logic 1201 allows for UE 115 to monitor for downlink grants in subsequent symbols of the subframe (e.g., the first symbol of the second slot) even when a downlink grant was not received in the first symbol of the first slot. A determination is made, at block 604, whether the UE detects the plurality of downlink grants. Within the execution environment of partial SF logic 1201, UE 115 may determine if signals received in the first symbol of the second slot are several downlink grants. If not, then the UE will continue monitoring for grants at the next subframe, beginning again at block 600. Otherwise, if the plurality of downlink grants are detected at the first symbol of the second slot of the subframe, then, at block 605, the UE receives downlink data from the serving base station over the set of downlink transmission resources associated with each of the plurality of grants. When received as an initial partial subframe, the PDCCH containing downlink grants received by UE 115 in the second slot may direct UE 115 for each of the short PDSCH opportunities and receive the downlink data over the short PDSCH.

With the increased numbers of transmission opportunities with the initial partial subframe, acknowledgement information, e.g., acknowledgement (ACK) and negative acknowledgement (NACK), for each of the short PDSCH may be multiplexed and sent by the UE back to the base station. Such multiplexing may include simply aggregating acknowledgement information or may include processing the acknowledgement information (e.g., performing an AND function on the ACK/NACK) which may allow the UE to report a combined acknowledgement information using fewer resources.

It should be noted that the number of HARQ processes may be increased in certain alternative aspects in order to achieve peak rates.

Figure 7:
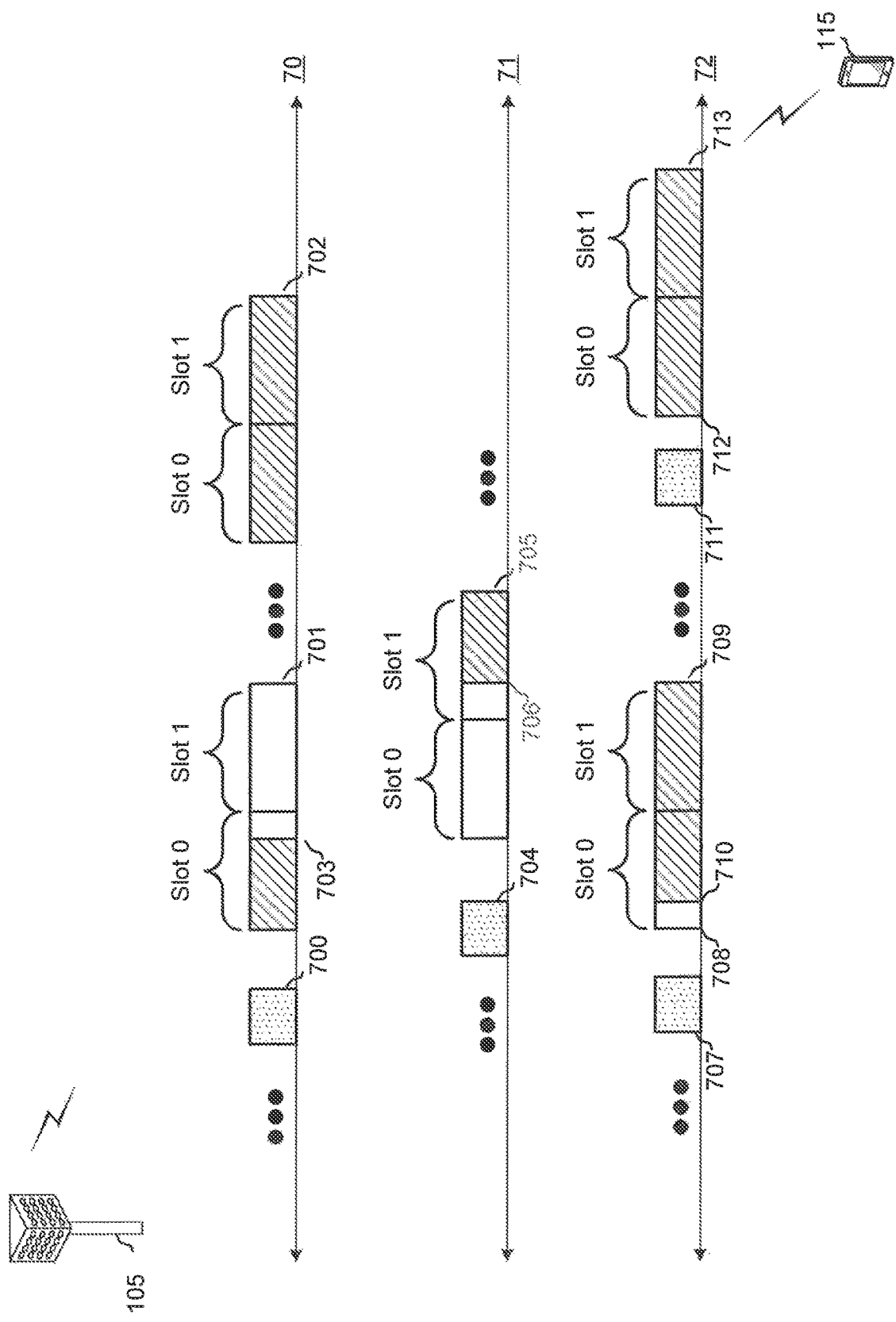
FIG. 7 is a block diagram illustrating a base station and a UE configured according to aspects of the present disclosure.
Figure 8:
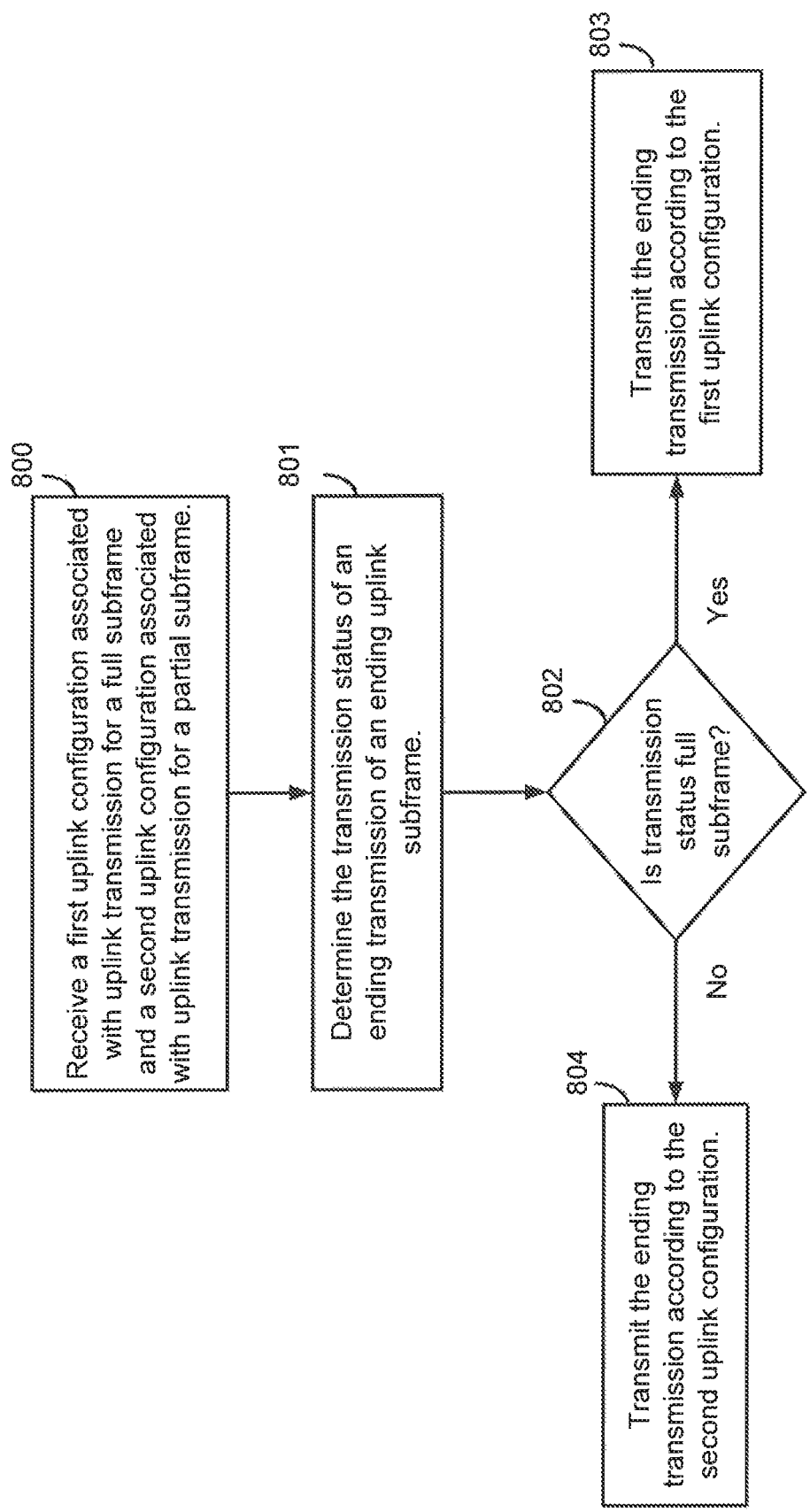
FIG. 8 is a block diagram illustrating example blocks executed to implement one aspect of the present disclosure.

FIG. 8 is a block diagram illustrating example blocks executed to implement one aspect of the present disclosure. The blocks of FIG. 8 will also be described with respect to the block diagram of FIG. 7 and with regard to UE 115 as detailed in FIG. 12. FIG. 7 is a block diagram illustrating a base station 105 and a UE 115, such as detailed in FIG. 12, configured according to aspects of the present disclosure. At block 800, a UE receives a first uplink configuration associated with uplink transmission for a full subframe and a second uplink configuration associated with uplink transmission for a partial subframe. The present aspect defines a PUSCH transmission ending partial subframe, ending in symbol 5/6 of the first slot of a subframe. The first and second uplink configurations provide for uplink control information (UCI) rate matching, for full subframe transmission and with new resources defined based on one slot transmission for partial subframe transmission. For example, base station 105 in communication stream 70 transmits the first and second uplink configurations including the UCI rate matching information at block 700. UE 115 receives these uplink configurations and stores them in memory 282 at UL configurations 1202 The configurations may include different beta factors for configuring full subframe and partial subframe transmissions. Beta factors (e.g., beta offset, ACK, CQI, and RI) correspond to specific dB values for UE 115 to transmit the uplink so that the base station may differentiate between PUSCH data, and ACK/CQI/RI transmissions.

At block 801, the UE determines the transmission status of an ending transmission of an ending uplink subframe. The transmission status describes whether the ending transmission will be for a full subframe duration or a partial subframe duration. The execution environment of partial SF logic 1201 allows UE 115 to determine whether the transmission status is for a full subframe duration or a partial subframe. At block 802, the determination is made whether the transmission status is for a full subframe. If so, then at block 803, the UE transmits the ending transmission according to the first uplink configuration. When the ending uplink transmission is for a full subframe, such as at subframe 702, the beta parameters for full subframe transmission are used by UE 115 to configure the transmissions, so that base station 105 may be able to differentiate that transmitted data. UE 115 would then transmit the ending transmission using the uplink configuration stored at UL configurations 1202 associated with the first uplink configuration. UE 115 would transmit via wireless radios 1200a-r and antennas 252a-r.

When the transmission status is not for a full subframe, then, at block 804, the UE transmits the ending transmission according to the second uplink configuration. Thus, for partial subframe ending transmissions, such as at subframe 701, the second uplink configuration will use the beta values for partial subframes. For the ending of the uplink transmissions, UE 115, within the execution environment of partial SF logic 1201, would stop transmitting at symbol 5, at 703, of Slot 0 of subframe 701.

It should be noted that, in additional or alternative aspects, one bit may be used from the multi-TTI grant to indicate whether the last subframe is full or partial subframe. Alternatively, one bit may be used in the common PDCCH (CPDCCH) to indicate whether the last subframe is full or partial subframe. Additionally, SRS can be configured for the last symbol of the end partial subframe. Each such additional aspects may be transmitted with control information at block 700.

Figure 9:
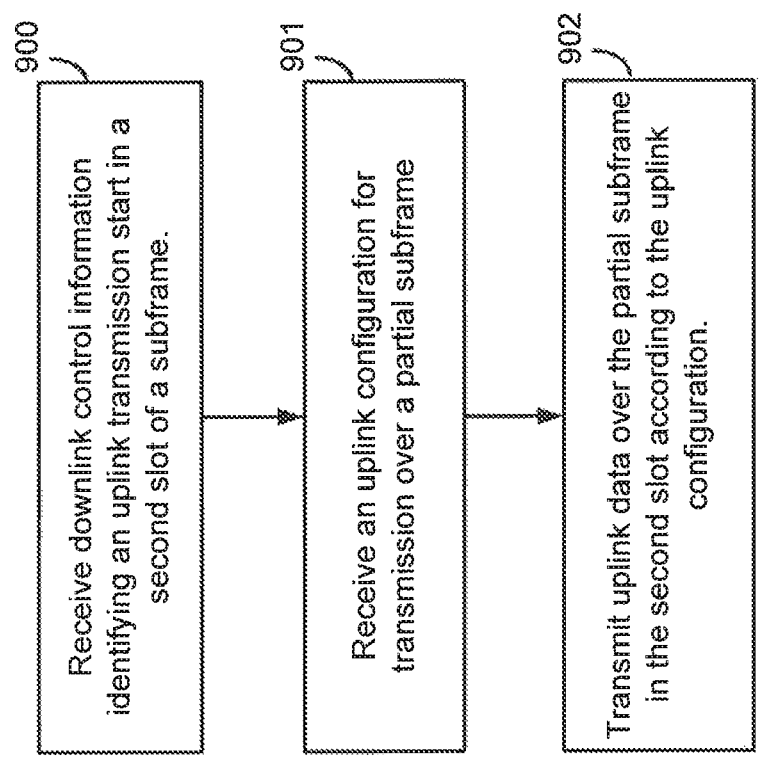
FIG. 9 is a block diagram illustrating example blocks executed to implement one aspect of the present disclosure.

FIG. 9 is a block diagram illustrating example blocks executed to implement one aspect of the present disclosure. The blocks of FIG. 9 will also be described with respect to the block diagram of FIG. 7 and with regard to UE 115 as detailed in FIG. 12. At block 900, a UE receives downlink control information (DCI) identifying an uplink transmission start in a second slot of a subframe. For example, at transmission stream 71, base station 105 transmits the DCI at block 704. UE 115 receives the DCI via antennas 252*a-r* and wireless radios 1200*a-r* and stores the downlink control information, including the identification of the uplink transmission start at DCI 1203, stored in memory 282. With operations including potential partial subframe transmissions, UE 115, under control of controller/processor 280, executes partial SF logic 1201. The execution environment of partial SF logic 1201 allows UE 115 to monitor for partial subframe transmission opportunities.

At block 901, the UE further receives an uplink configuration for transmission over a partial subframe. The uplink configuration may also be received together or separately at block 704. UE 115 receives the uplink configuration via antennas 252*a-r* and wireless radios 1200*a-r* and, under control of controller/processor 280, stores the uplink configuration at UL configurations 1202. As indicated above, beta parameters allow UE 115 to configure transmission of the uplink over the partial subframe in a manner that may be differentiated by the receiving base station. At block 902, the UE transmits the uplink data over the partial subframe in the second slot according to the uplink configuration. For example, within the execution environment of partial SF logic 1201, UE 115 may detect the beginning symbol for its uplink transmission at 706 of slot 1 of subframe 705. UE 115 would begin transmission via wireless radios 1200*a-r* and antennas 252*a-r* on the initial partial subframe of slot 1 and continue to the boundary of subframe 705.

The mode of operation described in FIG. 9 represents a scheduled mode aspect, in which the DCI indicates to UE 115 that uplink transmissions start in the second slot (slot 1) for an uplink initial partial subframe (subframe 705). In such scheduled mode operation, the new UCI mapping, stored at UL configurations 1202, including the partial subframe beta parameters are communicated for UE 115.

Figure 10A:
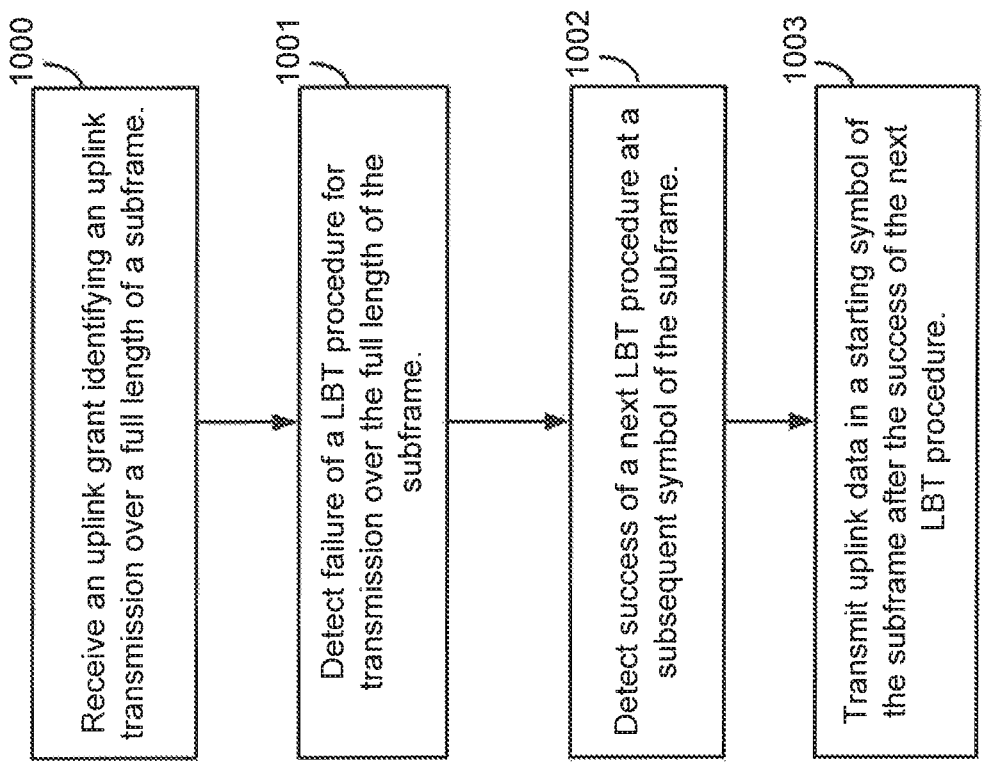
FIGS. 10A and 10B are block diagrams illustrating example blocks executed to implement aspects of the present disclosure.

FIG. 10A is a block diagram illustrating example blocks executed to implement one aspect of the present disclosure. The blocks of FIG. 10A will also be described with respect to the block diagram of FIG. 7 and with regard to UE 115 as detailed in FIG. 12. At block 1000, a UE receives an uplink grant identifying an uplink transmission over a full length of a subframe. With operations including potential partial subframe transmissions, UE 115, under control of controller/processor 280, executes partial SF logic 1201. The execution environment of partial SF logic 1201 allows UE 115 to monitor for partial subframe transmission opportunities. Thus, the uplink grant received, at block 707, at UE 115 via antennas 252*a-r* and wireless radios 1200*a-r*, indicates a full subframe transmission.

At block 1001, the UE detects a failure of an LBT procedure for transmission over the full length of the subframe. When UE 115 receives the uplink grant, at block 707, because the spectrum is shared, it will first perform an LBT, by executing, under control of controller/processor 280, LBT logic 1204, stored in memory 282, to secure the channel. Even though UE 115 has been scheduled for a full subframe uplink transmission, the failed LBT, at 708, causes UE 115, within the execution environment of partial SF logic 1201, to back off and miss the opportunity for the full transmission.

At block 1002, the UE detects success of a next LBT procedure at a subsequent symbol of the subframe. Because UE 115 is allowed initial partial subframe for uplink transmissions, UE 115, within the execution environment of partial SF logic 1201, would not have to back off transmissions for the entirety of subframe 709. Therefore, at the next available opportunity, symbol 710, UE 115 would perform another LBT procedure, through execution of LBT logic 1204, to secure the channel. For example, UE 115 may secure the channel for uplink transmission at symbol 3, symbol 7, or the like.

At block 1003, the UE transmits uplink data in a starting symbol of the subframe after the success of the next LBT procedure. Once UE 115 secures the channel, it may begin transmission via wireless radios 1200*a-r* and antennas 252*a-r*, in the next available symbol 710 of the remaining initial partial subframe, of subframe 709. In this semi-scheduled mode, UE 115 may, through the execution environment of partial SF logic 1201, either re-perform rate matching to account for the smaller number of resource elements or symbols available for transmission or may perform puncturing of the first half of the original transmission scheduled, for which the channel had not yet been secured.

Prior to transmitting the uplink data, UE 115 would transmit a DMRS. For example, UE 115, under control of controller/processor 280, executes DMRS generator 1205, stored in memory 282. The execution environment of DMRS generator 1205 allows UE 115 to generate the appropriate DMRS for the transmission. In an additional aspect, UE 115 may implicitly identify the starting symbol 710 for uplink transmission by selecting a particular cyclic shift of the DMRS. Thus, when UE 115 determines which symbol it will begin uplink transmissions, within the execution environment of DMRS generator 1205, UE 115 will select the cyclic shift and transmit the DMRS to base station 105 using the cyclic shift. Using such a semi-scheduled mode, UE 115 may either perform initial transmission or retransmission. Additionally, the semi-scheduled mode would not affect or change the reference subframe for category 4 LBT procedures.

Figure 10B:
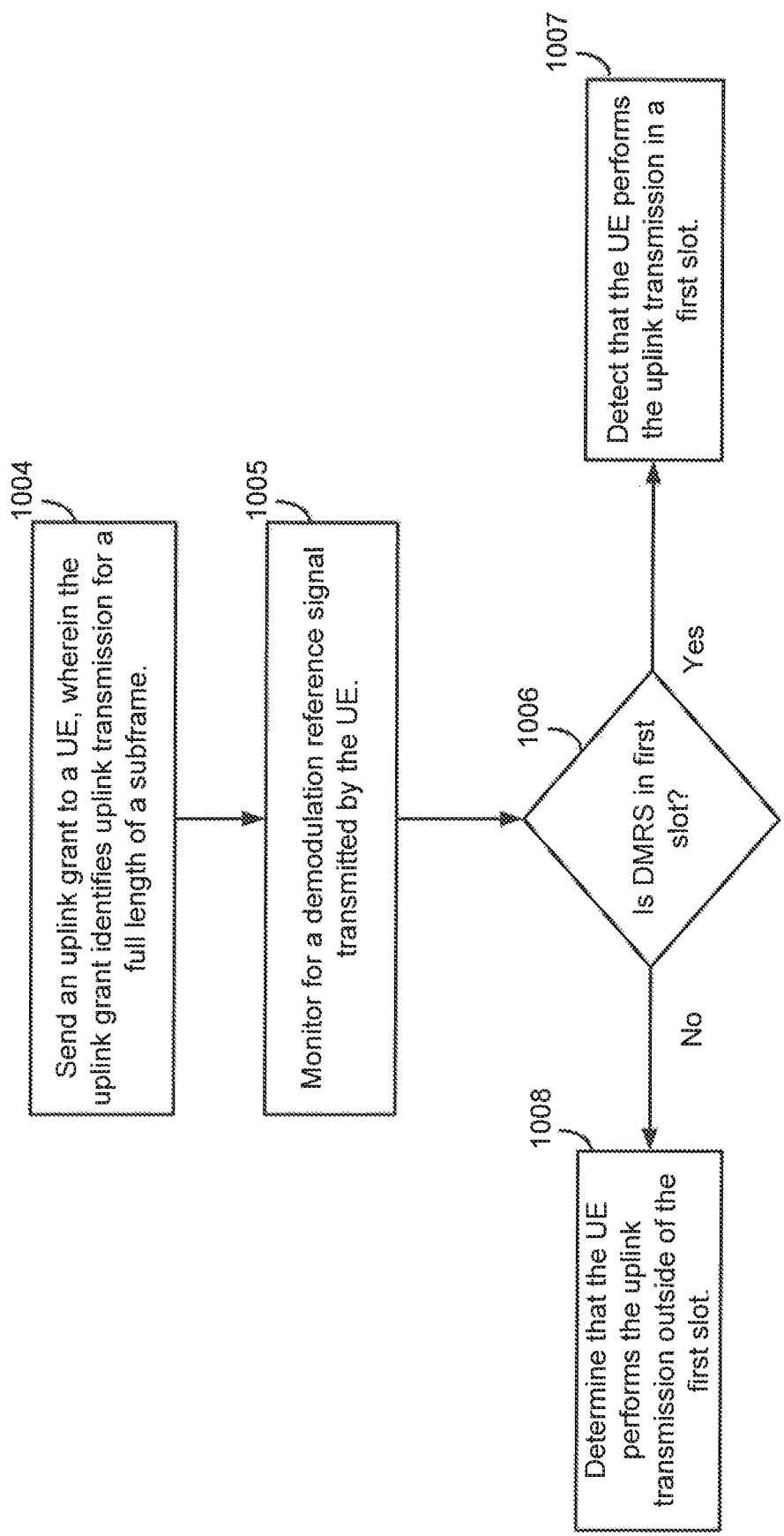

FIG. 10B is a block diagram illustrating example blocks executed to implement one aspect of the present disclosure. The blocks of FIG. 10B will also be described with respect to the block diagram of FIG. 7 and with regard to gNB 105 as detailed in FIG. 11. At block 1004, a base station sends an uplink grant to a served UE wherein the uplink grant identifies uplink transmission for a full length of a subframe. FIG. 10B provides the semi-scheduled mode from the perspective of base station 105. With operations including potential partial subframe transmissions, gNB 105, under control of controller/processor 240, also executes partial SF logic 1103. The execution environment of partial SF logic 1103 allows gNB 105 to monitor for partial subframe transmission opportunities.

At block 1005, the base station monitors for a DMRS transmitted by the UE. Because gNB 105 has scheduled UE 115 for full subframe transmission at block 707, gNB 105 would only know that when UE 115 transmits by monitoring for the DMRS. At block 1006, a determination is made whether the DMRS has been sent in the first slot. gNB 105 receives signals via antennas 234$a$-$t$ and wireless radios 1100$a$-$t$ and decodes the signals through the components of wireless radios 1100$a$-$t$ to determine whether the signals include a DMRS. If so, then at block 1007, the base station detects that the UE performs the uplink transmission in a first slot according to the original full subframe transmission. Otherwise, if the DMRS is not in the first slot, then, at block 1008, the base station determines that the UE performs the uplink transmission outside of the first slot. Within the execution environment of partial SF logic 1103, by detecting the DMRS in a location other than the first slot, gNB 105 would determine that UE 115 fell back to an uplink initial partial subframe with a starting symbol at a location other than the first slot.

It should be noted as above, in alternative aspects, gNB 105 may read the cyclic shift of the DMRS to determine which symbol 710 UE 115 will beginning uplink transmission.

gNB 105 may also detect through DMRS transmitted by UE 115 that it has successfully secured the channel with an LBT at 712, and transmitted uplink data for the full subframe at subframe 713. Therefore, after initially scheduling UE 115 for full subframe transmission at uplink grant 711, base station 105 detects the full subframe transmission of UE 115 through detection of the DMRS in slot 0 of subframe 713.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 6, 8, 9, 10A, and 10B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE) from a serving base station, downlink control information identifying an uplink transmission start in a second slot of a subframe;
   receiving, at the UE from the serving base station, an uplink configuration for transmission over a partial subframe, wherein the uplink configuration includes beta parameters for configuring partial subframe transmissions, and wherein the beta parameters include beta offset, acknowledgement (ACK), channel quality indicator (CQI), rank indicator (RI), or a combination thereof; and
   transmitting, by the UE, uplink data over the partial subframe in the second slot of the subframe according to the uplink configuration.

2. The method of claim 1, wherein an ending of the transmitting is defined at symbol 6 of the second slot.

3. The method of claim 1, wherein the second slot of the subframe is immediately subsequent to an initial slot of the subframe.

4. The method of claim 1, wherein the subframe comprises at least two slots.

5. The method of claim 1, wherein the subframe comprises 7 symbols.

6. The method of claim 1, further comprising:
   monitoring, at the UE, for partial subframe transmission opportunities.

7. The method of claim 1, wherein the beta parameters include the beta offset, the ACK, the CQI, and the RI.

8. The method of claim 1, further comprising storing, at a memory of the UE, the downlink control information.

9. The method of claim 1, further comprising detecting, at the UE, a beginning symbol for transmitting.

10. The method of claim 1, further comprising storing, at a memory of the UE, the uplink configuration.

11. The method of claim 1 further comprising receiving, at the UE from the serving base station, a second uplink configuration for transmission over a full subframe.

12. The method of claim 1, wherein the beta parameters include power level details related to transmission of the uplink data, and wherein the power level details allows the serving base station to differentiate between the uplink data and an acknowledgement transmission.

13. An apparatus configured for wireless communication, the apparatus comprising:
   at least one processor; and
   a memory coupled to the at least one processor, wherein the at least one processor is configured to:
      receive, from a serving base station, downlink control information identifying an uplink transmission start in a second slot of a subframe;
      receive, from the serving base station, an uplink configuration for transmission over a partial subframe, wherein the uplink configuration includes beta parameters for configuring partial subframe transmissions, wherein the uplink configuration includes beta parameters for configuring partial subframe transmissions, wherein the beta parameters include beta offset, acknowledgement (ACK), channel quality indicator (CQI), rank indicator (RI), or a combination thereof; and
      initiate transmission of uplink data over the partial subframe in the second slot of the subframe according to the uplink configuration.

14. The apparatus of claim 13, wherein:
   a previous subframe is received prior to the subframe; and
   the second slot of the previous subframe is immediately subsequent to an initial slot of the previous subframe.

15. The apparatus of claim 13, wherein the second slot is immediately subsequent to an initial slot of the subframe.

16. The apparatus of claim 13, wherein the subframe comprises 7 symbols.

17. The apparatus of claim 13, wherein the downlink control information is received via the second slot of a previous subframe.

18. The apparatus of claim 13, wherein the uplink configuration is received via the second slot of a previous subframe.

19. The apparatus of claim 13, wherein the at least one processor is further configured to:
   determine to transmit a partial subframe;
   select a configuration for a partial subframe transmission, the configuration based on the beta offset, the ACK, the CQI, the RI, or the combination thereof; and
   configure the partial subframe transmission based on the configuration.

20. A non-transitory computer-readable storage medium storing instructions that, when executed by one or more processors, cause the one or more processors to perform operations comprising:
   receiving downlink control information identifying an uplink transmission start in a second slot of a subframe;
   receiving an uplink configuration for transmission over a partial subframe, wherein the uplink configuration includes beta parameters for configuring partial subframe transmissions, and wherein the beta parameters include beta offset, acknowledgement (ACK), channel quality indicator (CQI), rank indicator (RI), or a combination thereof; and
   transmitting uplink data over the partial subframe in the second slot of the subframe according to the uplink configuration.

21. The non-transitory computer-readable storage medium of claim 20, wherein the second slot of the subframe is immediately subsequent to an initial slot of the subframe.

22. The non-transitory computer-readable storage medium of claim 20, wherein the subframe comprises at least two slots.

23. The non-transitory computer-readable storage medium of claim 20, wherein the subframe comprises 7 symbols.

24. The non-transitory computer-readable storage medium of claim 20, the operations further comprising monitoring for partial subframe transmission opportunities.

25. The non-transitory computer-readable storage medium of claim 20, wherein the beta parameters include the beta offset, the ACK, the CQI, and the RI.

26. The non-transitory computer-readable storage medium of claim 20, the operations further comprising storing the downlink control information.

27. The non-transitory computer-readable storage medium of claim 20, the operations further comprising detecting a beginning symbol for transmitting.

28. The non-transitory computer-readable storage medium of claim 20, the operations further comprising storing the uplink configuration.

29. The non-transitory computer-readable storage medium of claim 20, the operations further comprising:
   determining to transmit a partial subframe;
   selecting a configuration for a partial subframe transmission, the configuration based on the beta offset, the ACK, the CQI, the RI, or the combination thereof; and
   configuring the partial subframe transmission based on the configuration.

30. The non-transitory computer-readable storage medium of claim 20, wherein the beta parameters include power level details related to transmission of the uplink data, and wherein the power level details allows a serving base station to differentiate between the uplink data and an acknowledgement transmission.

\* \* \* \* \*